US012008948B2

(12) United States Patent
Kim et al.

(10) Patent No.: US 12,008,948 B2
(45) Date of Patent: Jun. 11, 2024

(54) DISPLAY DEVICE

(71) Applicant: Samsung Display Co., LTD., Yongin-si (KR)

(72) Inventors: Soo Yeon Kim, Yongin-si (KR); Tae Gon Im, Yongin-si (KR); Jong Jae Lee, Yongin-si (KR); Dae Gwang Jang, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/739,807

(22) Filed: May 9, 2022

(65) Prior Publication Data

US 2022/0383802 A1 Dec. 1, 2022

(30) Foreign Application Priority Data

May 31, 2021 (KR) ........................ 10-2021-0070228

(51) Int. Cl.
*G09G 3/32* (2016.01)

(52) U.S. Cl.
CPC ....... *G09G 3/32* (2013.01); *G09G 2300/0842* (2013.01); *G09G 2320/0233* (2013.01);
(Continued)

(58) Field of Classification Search
CPC ...... G09G 3/32-3291; G09G 2300/0421-043; G09G 2300/0842;
(Continued)

(56) References Cited

U.S. PATENT DOCUMENTS 9,978,969 B2 5/2018 Shin et al.
10,366,656 B2 7/2019 Jeon et al.
(Continued)

FOREIGN PATENT DOCUMENTS

KR 10-0902245 6/2009
KR 10-2015-0027906 3/2015
(Continued)

OTHER PUBLICATIONS

International Search Report corresponding to International Application No. PCT/KR2022/007664 dated Aug. 24, 2022.

*Primary Examiner* — Nathan Danielsen
(74) *Attorney, Agent, or Firm* — KILE PARK REED & HOUTTEMAN PLLC

(57) ABSTRACT

A display device includes pixels; a sensing block generating first sensing data during a first sensing period, and generating second sensing data and third sensing data during a second sensing period; and a timing controller compensating first image data with second image data based on the first sensing data, the second sensing data, and the third sensing data. The sensing block generates the first sensing data corresponding to an initial channel voltage applied to each of sensing channels and at least one auxiliary sensing channel during the first sensing period, generates the second sensing data by sensing characteristic information of the pixels corresponding to an initialization voltage applied to the pixels during the second sensing period, and generates the third sensing data corresponding to a reference voltage applied to the at least one auxiliary sensing channel during the second sensing period.

19 Claims, 8 Drawing Sheets

(52) U.S. Cl.
CPC ............... *G09G 2320/0295* (2013.01); *G09G 2330/028* (2013.01)

(58) Field of Classification Search
CPC ... G09G 2300/0871; G09G 2310/0243; G09G 2310/0251; G09G 2310/027–0275; G09G 2310/06; G09G 2310/08; G09G 2320/0233; G09G 2320/029; G09G 2320/0295; G09G 2320/04; G09G 2320/045; G09G 2320/0693; G09G 2330/02; G09G 2330/023; G09G 2330/027; G09G 2330/12
See application file for complete search history.

(56) References Cited

U.S. PATENT DOCUMENTS

| | | | | |
|---|---|---|---|---|
| 2009/0184901 | A1 | 7/2009 | Kwon | |
| 2018/0197468 | A1* | 7/2018 | Wu | G09G 3/3225 |
| 2019/0251900 | A1* | 8/2019 | Min | G09G 3/3283 |
| 2020/0202776 | A1* | 6/2020 | Liang | G09G 3/3275 |
| 2022/0122525 | A1* | 4/2022 | Lim | G09G 3/3233 |

FOREIGN PATENT DOCUMENTS

| | | |
|---|---|---|
| KR | 10-2017-0132016 | 12/2017 |
| KR | 10-2017-0132598 | 12/2017 |
| KR | 10-2018-0006532 | 1/2018 |
| KR | 10-2018-0076467 | 7/2018 |

* cited by examiner

DISPLAY DEVICE

CROSS-REFERENCE TO RELATED APPLICATION(S)

This application claims priority to and benefits of Korean Patent Application No. 10-2021-0070228 under 35 U.S.C. § 119, filed on May 31, 2021 in the Korean Intellectual Property Office, the entire contents of which are incorporated herein by reference.

BACKGROUND

1. Technical Field

The disclosure relates to a display device.

2. Description of the Related Art

With increasing interest in information display and increasing demand for use of portable information media, demand for display devices and commercialization are being made intensively.

Among display devices, a light emitting display device displays an image using pixels connected to scan lines and data lines. To this end, each of the pixels may include a light emitting element and a driving transistor.

The driving transistor controls the amount of current supplied to the light emitting element in response to a data signal supplied from a data line. The light emitting element generates light having a luminance in response to the amount of current supplied from the driving transistor.

In order for the display device to display an image of uniform quality, the driving transistor included in each of the pixels must supply a uniform current to the light emitting element in response to the data signal. However, the driving transistor included in each of the pixels has a unique characteristic value that may cause a deviation from a uniform current.

An external compensation method for externally compensating for such characteristic deviation of the pixels has been proposed. The external compensation method may sense mobility and threshold voltage information of the driving transistor included in each of the pixels, and may control the data signal supplied to each of the pixels in response to the sensed information.

However, in case that the display device is driven, the external compensation method may not accurately sense the characteristic deviation of the pixels due to deviation of sensing channels, heat generated by a driver, or the like, and thus has a limitation in compensating for image quality.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

The disclosure provides a display device that compensates for image data (or data voltage) by reflecting a change in characteristic of a data driver while sensing characteristics of pixels.

A display device according to an embodiment may include pixels; a sensing block generating first sensing data during a first sensing period, and generating second sensing data and third sensing data during a second sensing period, the sensing block including sensing channels; and at least one auxiliary sensing channel; and a timing controller compensating first image data with second image data based on the first sensing data, the second sensing data, and the third sensing data. The sensing block may generate the first sensing data corresponding to an initial channel voltage applied to each of the sensing channels and the at least one auxiliary sensing channel during the first sensing period, the sensing block may generate the second sensing data by sensing characteristic information of the pixels corresponding to an initialization voltage applied to the pixels during the second sensing period, and the sensing block may generate the third sensing data corresponding to a reference voltage applied to the at least one auxiliary sensing channel during the second sensing period.

The timing controller may compensate the first image data with the second image data by removing an initial deviation of the sensing channels from the second sensing data with the first sensing data and removing a deviation of the sensing block generated during the second sensing period with the third sensing data.

The first sensing period may be a period for sensing characteristics of each of the sensing channels of the sensing block before driving the pixels, and the second sensing period may be a period in which the initialization voltage is supplied to the pixels and the characteristic information of the pixels is sensed.

The display device may further include a power supply generating and outputting the initial channel voltage, the initialization voltage, and the reference voltage. The initial channel voltage may be supplied to the sensing block through an initial channel voltage line electrically connected to the power supply, the initialization voltage may be supplied to the sensing block through an initialization voltage line electrically connected to the power supply, and the reference voltage may be supplied to the sensing block through a reference voltage line electrically connected to the power supply.

The display device may further include a switching matrix electrically connected to the sensing block; a multiplexer electrically connected to the switching matrix; and an analog-to-digital converter electrically connected to the multiplexer. The analog-to-digital converter may provide the first sensing data, the second sensing data, and the third sensing data to the timing controller.

Each of the sensing channels may be electrically connected to the initial channel voltage line according to an operation of an initial channel voltage switch, and each of the sensing channels may be electrically connected to the switching matrix according to an operation of a channel switch.

The at least one auxiliary sensing channel may be electrically connected to the reference voltage line according to an operation of a reference switch, and the at least one auxiliary sensing channel may be electrically connected to the switching matrix according to an operation of the channel switch.

The at least one auxiliary sensing channel may be adjacent to at least one channel among the sensing channels.

Each of the pixels may include a light emitting element; a first transistor electrically connected between a first electrode of the light emitting element and a power line and including a gate electrode electrically connected to a first node; a second transistor electrically connected between a data line and the first node and including a gate electrode electrically connected to a scan line; and a third transistor electrically connected between a sensing line and a second node and including a gate electrode electrically connected to a sensing control line.

Each of the sensing channels may be electrically connected to the sensing line.

A display device according to an embodiment may include a display panel including pixels; and a data driver generating first sensing data by sensing characteristic information for each sensing channel during a first sensing period before the display panel is driven, and generating second sensing data by sensing characteristic information of the pixels during a second sensing period in which the display panel is driven. The data driver may generate third sensing data by sensing characteristic change information of the data driver during the second sensing period.

The data driver may include a sensing block including the sensing channels and at least one auxiliary sensing channel; a switching matrix electrically connected to the sensing block; a multiplexer electrically connected to the switching matrix; and an analog-to-digital converter electrically connected to the multiplexer.

The display device may further include a timing controller generating second image data by compensating for first image data based on the first sensing data, the second sensing data, and the third sensing data, and providing the second image data to the data driver.

The timing controller may compensate the first image data with the second image data by removing an initial deviation of the sensing channels from the second sensing data with the first sensing data and removing a deviation of the sensing block generated during the second sensing period with the third sensing data.

The first sensing data corresponding to an initial channel voltage may be generated by supplying the initial channel voltage to the sensing channels and the at least one auxiliary sensing channel during the first sensing period, the second sensing data corresponding to an initialization voltage may be generated by supplying the initialization voltage to the sensing channels during the second sensing period, and the third sensing data corresponding to a reference voltage may be generated by supplying the reference voltage to the at least one auxiliary sensing channel during the second sensing period.

The display device may further include a power supply generating the initial channel voltage, the initialization voltage, and the reference voltage, outputting the initial channel voltage through an initial channel voltage line electrically connected to the data driver, outputting the initialization voltage through an initialization voltage line electrically connected to the data driver, and outputting the reference voltage through a reference voltage line electrically connected to the data driver. Each of the sensing channels may be electrically connected to the initial channel voltage line according to an operation of an initial channel voltage switch, and each of the sensing channels may be electrically connected to the switching matrix according to an operation of a channel switch.

The each of the sensing channels may be electrically connected to the initial channel voltage line according to the operation of the initial channel voltage switch, and the each of the sensing channels may be electrically connected to the switching matrix according to the operation of the channel switch.

The at least one auxiliary sensing channel may be electrically connected to the reference voltage line according to an operation of a reference switch, and the at least one auxiliary sensing channel may be electrically connected to the switching matrix according to an operation of the channel switch.

The at least one auxiliary sensing channel may be adjacent to at least one channel among the sensing channels.

A display device may include a display panel including pixels respectively electrically connected to sensing lines; a data driver electrically connected to the sensing lines; and a power supply electrically connected to the data driver through an initial channel voltage line, an initialization voltage line, and at least one reference voltage line. The power supply may supply a reference voltage for sensing characteristic information of the data driver through the at least one reference voltage line while the display panel is driven.

BRIEF DESCRIPTION OF THE DRAWINGS

The accompanying drawings, which are included to provide a further understanding of the disclosure, and are incorporated in and constitute a part of this specification, illustrate embodiments, and, together with the description, serve to explain principles of the disclosure, in which.

DETAILED DESCRIPTION OF THE EMBODIMENTS

Figure 1:
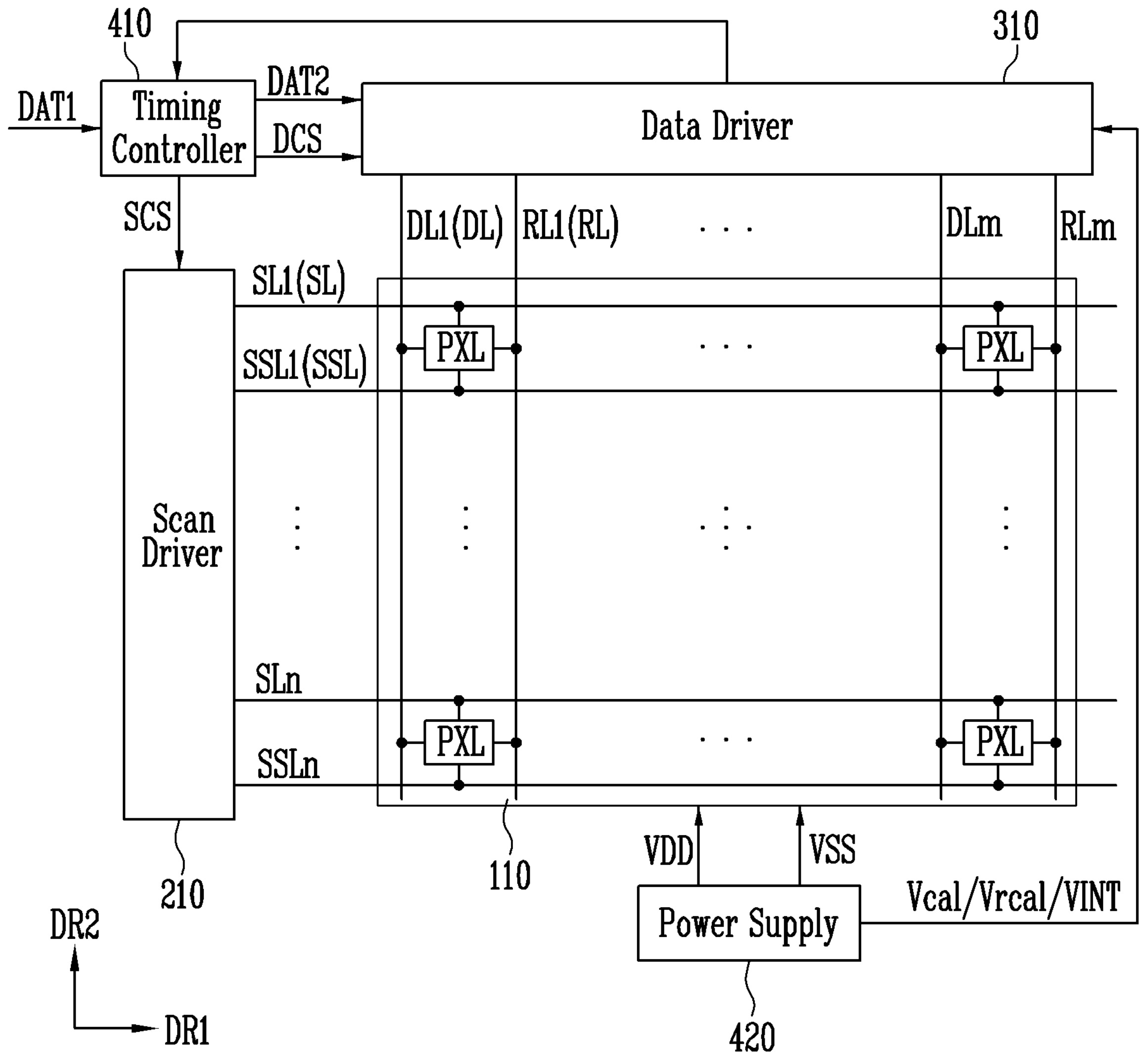
FIG. 1 is a schematic block diagram schematically illustrating a display device according to an embodiment.

As the disclosure allows for various changes and numerous embodiments, embodiments will be illustrated in the drawings and described in detail in the written description. However, this is not intended to limit the disclosure to particular modes of practice, and it is to be appreciated that all changes, equivalents, and substitutes within the spirit and technical scope of the disclosure are encompassed in the disclosure.

In the drawings, sizes, thicknesses, ratios, and dimensions of the elements may be exaggerated for ease of description and for clarity. Like numbers refer to like elements throughout.

As used herein, the singular forms, “a,” “an,” and “the” are intended to include the plural forms as well, unless the context clearly indicates otherwise.

In the specification and the claims, the term “and/or” is intended to include any combination of the terms “and” and “or” for the purpose of its meaning and interpretation. For example, “A and/or B” may be understood to mean “A, B, or A and B.” The terms “and” and “or” may be used in the conjunctive or disjunctive sense and may be understood to be equivalent to “and/or.”

In the specification and the claims, the phrase “at least one of” is intended to include the meaning of “at least one selected from the group of” for the purpose of its meaning and interpretation. For example, “at least one of A and B” may be understood to mean “A, B, or A and B.”

It will be understood that, although the terms “first”, “second”, etc. may be used herein to describe various elements, these elements should not be limited by these terms. These terms are only used to distinguish one element from another element. For instance, a first element discussed below could be termed a second element without departing from the scope of the disclosure. Similarly, the second element could also be termed the first element. In the disclosure, the singular expressions are intended to include the plural expressions as well, unless the context clearly indicates otherwise.

The spatially relative terms “below”, “beneath”, “lower”, “above”, “upper”, or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned “below” or “beneath” another device may be placed “above” another device. Accordingly, the illustrative term “below” may include both the lower and upper positions. The device may also be oriented in other directions and thus the spatially relative terms may be interpreted differently depending on the orientations.

It will be understood that when an element (or a region, a layer, a portion, or the like) is referred to as “being on”, “connected to” or “coupled to” another element in the specification, it can be directly disposed on, connected or coupled to another element mentioned above, or intervening elements may be disposed therebetween.

It will be understood that the terms “connected to” or “coupled to” may include a physical or electrical connection or coupling.

The terms “overlap” or “overlapped” mean that a first object may be above or below or to a side of a second object, and vice versa. Additionally, the term “overlap” may include layer, stack, face or facing, extending over, covering, or partly covering or any other suitable term as would be appreciated and understood by those of ordinary skill in the art.

When an element is described as ‘not overlapping’ or ‘to not overlap’ another element, this may include that the elements are spaced apart from each other, offset from each other, or set aside from each other or any other suitable term as would be appreciated and understood by those of ordinary skill in the art.

The terms “face” and “facing” mean that a first element may directly or indirectly oppose a second element. In a case in which a third element intervenes between the first and second element, the first and second element may be understood as being indirectly opposed to one another, although still facing each other.

It will be further understood that the terms “comprise”, “include”, “have”, and variations thereof when used in the disclosure, specify the presence of stated features, integers, steps, operations, elements, components, and/or combinations of them but do not preclude the presence or addition of one or more other features, integers, steps, operations, elements, components, and/or combinations thereof.

The phrase “in a plan view” means viewing the object from the top, and the phrase “in a schematic cross-sectional view” means viewing a cross-section of which the object is vertically cut from the side.

“About” or “approximately” as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, “about” may mean within one or more standard deviations, or within ±30%, 20%, 10%, 5% of the stated value.

Unless otherwise defined or implied herein, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments may be described and illustrated in the accompanying drawings in terms of functional blocks, units, and/or modules.

Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies.

In the case of the blocks, units, and/or modules being implemented by microprocessors or other similar hardware, they may be programmed and controlled using software (for example, microcode) to perform various functions discussed herein and may optionally be driven by firmware and/or software.

It is also contemplated that each block, unit, and/or module may be implemented by dedicated hardware, or as a combination of dedicated hardware to perform some functions and a processor (for example, one or more programmed microprocessors and associated circuitry) to perform other functions.

Each block, unit, and/or module of embodiments may be physically separated into two or more interacting and discrete blocks, units, and/or modules without departing from the scope of the disclosure.

Further, the blocks, units, and/or modules of embodiments may be physically combined into more complex blocks, units, and/or modules without departing from the scope of the disclosure.

Hereinafter, a display device according to embodiments of the disclosure will be described with reference to the drawings related to the embodiments of the disclosure.

FIG. 1 is a schematic block diagram schematically illustrating a display device according to an embodiment.

Referring to FIG. 1, a display device according to an embodiment may include a display panel 110, a scan driver 210, a data driver 310, a timing controller 410, and a power supply 420.

The display device may be a flat panel display device, a flexible display device, a curved display device, a foldable display device, a bendable display device, or a stretchable display device. Also, the display device may be a transparent display device, a head-mounted display device, or a wearable display device. The display device may be applied to various electronic devices such as a smart phone, a tablet, a smart pad, a TV, and a monitor.

The display device may be implemented as a self-light emitting display device including self-light emitting elements. For example, the display device may be an organic light emitting display device including organic light emitting elements, a display device including inorganic light emitting elements, or a display device including light emitting elements composed of an inorganic material and an organic material in combination.

The display panel 110 may include pixels PXL respectively connected to scan lines SL1 to SLn, sensing control lines SSL1 to SSLn, data lines DL1 to DLm, and sensing lines RL1 to RLm. The scan lines SL1 to SLn and the sensing control lines SSL1 to SSLn may extend in parallel in a first direction DR1, and the data lines DL1 to DLm and the sensing lines RL1 to RLm may extend in parallel in a second direction DR2 perpendicular to the first direction DR1.

The display panel 110 may receive a first driving voltage VDD, a second driving voltage VSS, an initialization voltage VINT, an initial channel voltage Vcal, and a reference voltage Vrcal from the power supply 420 to be described later. A detailed configuration of a pixel PXL will be described with reference to FIG. 2.

The scan driver 210 may receive a scan control signal SCS from the timing controller 410 and generate a scan signal and a sensing control signal based on the scan control signal SCS.

The scan driver 210 may provide the scan signal to each of the scan lines SL1 to SLn. For example, the scan signal may be set to a gate-on voltage at which a switching transistor included in the pixel PXL may be turned on, and the scan signal may be used to apply a data signal (or data voltage) to the pixel PXL.

Also, the scan driver 210 may provide the sensing control signal to each of the sensing control lines SSL1 to SSLn. The sensing control signal may be set to a gate-on voltage at which a sensing transistor included in the pixel PXL may be turned on, and the sensing control signal may be used to sense (or extract) a driving current flowing through the pixel PXL or apply the initialization voltage VINT to the pixel PXL.

Also, although one scan driver 210 is shown in FIG. 1, the disclosure is not limited thereto. According to an embodiment, the scan driver 210 may include a first scan driver for supplying the scan signal to the display panel 110 and a first sensing driver for supplying the sensing control signal to the display panel 110. For example, the first scan driver and the first sensing driver may be implemented as separate components and positioned on both sides of the display panel 110.

The data driver 310 may receive a data control signal DCS from the timing controller 410, convert digital image data (or second image data) DAT2 compensated based on the data control signal DCS into an analog data signal (or data voltage), and provide the data voltage (or data signal) to each of the data lines DL1 to DLm.

For example, the data driver 310 may supply the data signal to each of the data lines DL1 to DLm during an active period of one frame. The data signal may be a data voltage for displaying an effective image, and may be a value corresponding to the second image data DAT2.

The data driver 310 may include at least one sensing block that senses a channel deviation of sensing channels and/or at least one auxiliary sensing channel and sensing characteristics of the pixels PXL.

The data driver 310 may sense an offset and a gain according to characteristics of each sensing channel of the sensing block before the display panel 110 is driven. This period may be referred to as a first sensing period.

The data driver 310 may supply the initial channel voltage Vcal supplied from the power supply 420 to the sensing block under the control of the timing controller 410.

The data driver 310 may receive sensing currents applied to the sensing block in response to the initial channel voltage Vcal. The sensing currents may include sensing deviation information (for example, first sensing data) generated according to characteristics (for example, resistance, capacitance, and the like) of each sensing channel.

The data driver 310 may supply the initialization voltage VINT supplied from the power supply 420 to any one sensing line RL among the sensing lines RL1 to RLm under the control of the timing controller 410.

The data driver 310 may supply the initialization voltage VINT by dividing it into one for display and one for sensing under the control of the timing controller 410. For example, in the active period of one frame, the data driver 310 may supply the initialization voltage VINT different from the second driving voltage VSS to the sensing line RL. A period in which the initialization voltage VINT for sensing is supplied to the sensing line RL and characteristic information of the pixels PXL is sensed may be referred to as a second sensing period.

The data driver 310 may receive at least one sensing current from at least one of the pixels PXL through the sensing line RL. The sensing current may include information on a threshold voltage and/or mobility of a driving transistor (or a first transistor) included in the pixel PXL to be sensed. The data driver 310 may calculate characteristics of the driving transistor based on the sensing current and provide sensing data (for example, second sensing data) corresponding to the calculated characteristic to the timing controller 410. The timing controller 410 to be described later may compensate for the digital image data and/or the data signal based on the sensing data.

Also, during the second sensing period, the data driver 310 may receive the sensing currents applied to the auxiliary sensing channel in response to the reference voltage Vrcal. The sensing currents may include characteristic change information (for example, third sensing data) of the sensing block (or the data driver 310) that may be generated due to heat generated by the data driver 310.

FIG. 1 shows the data driver 310 that supplies the data signal and receives the sensing current, but the disclosure is not limited thereto. According to an embodiment, a sensor or a sensing unit (not shown) may be separately provided in the display device, and a sensing line may be connected to the sensing unit. The sensing unit may receive the sensing current, calculate the sensing data, and provide the sensing data to the timing controller 410.

The timing controller 410 may receive first image data DAT1 and timing control signals from outside (for example, a graphic processor). The timing control signals may include a dot clock, a data enable signal, a vertical synchronization signal, a horizontal synchronization signal, and the like within the spirit and the scope of the disclosure.

Using the timing control signals supplied from the outside and timing setting information stored therein, the timing controller 410 may generates the scan control signal SCS for controlling driving timing of the scan driver 210 and provide the scan control signal SCS to the scan driver 210, and may generate the data control signal DCS for controlling driving timing of the data driver 310 and provide the data control signal DCS to the data driver 310.

The timing controller 410 may include at least one memory to store the sensing data received from the data driver 310. For example, first sensing data may be stored in a first memory, second sensing data may be stored in a second memory, and third sensing data may be stored in a third memory. The disclosure is not limited thereto, and the memory may be implemented as a configuration separate from the timing controller 410, or may be implemented to be included in the data driver 310.

The timing controller 410 may change the first image data DAT1 based on the sensing data (for example, the first sensing data, the second sensing data, and the third sensing data) stored in the first to third memories to generate the second image data DAT2. Accordingly, the data driver 310 may provide a compensated data signal (or data voltage) corresponding to the second image data DAT2 to the pixels PXL in an image display period.

The timing controller 410 may compensate the first image data DAT1 with the second image data DAT2 using data to which the characteristic information of the pixels PLX is reflected by removing an initial deviation of the sensing channels from the second sensing data using the first sensing data and removing the channel deviation during the second sensing period using the third sensing data.

The power supply 420 may generate and output the first driving voltage VDD, the second driving voltage VSS, the initialization voltage VINT, the initial channel voltage Vcal, and the reference voltage Vrcal. According to an embodiment, the power supply 420 may output a voltage corresponding to the reference voltage Vrcal using the first driving voltage VDD without separately generating the reference voltage Vrcal.

The power supply 420 may supply the first driving voltage VDD and the second driving voltage VSS to the pixel PXL through power lines connected to the display panel 110.

The power supply 420 may supply the initialization voltage VINT to the pixel PXL through power lines connected to the data driver 310 and/or the display panel 110.

Also, the power supply 420 may supply the initial channel voltage Vcal and the reference voltage Vrcal to the data driver 310 through power lines connected to the sensing channel of the data driver 310.

Hereinafter, a pixel included in the display device according to an embodiment will be described with reference to FIG. 2.

Figure 2:
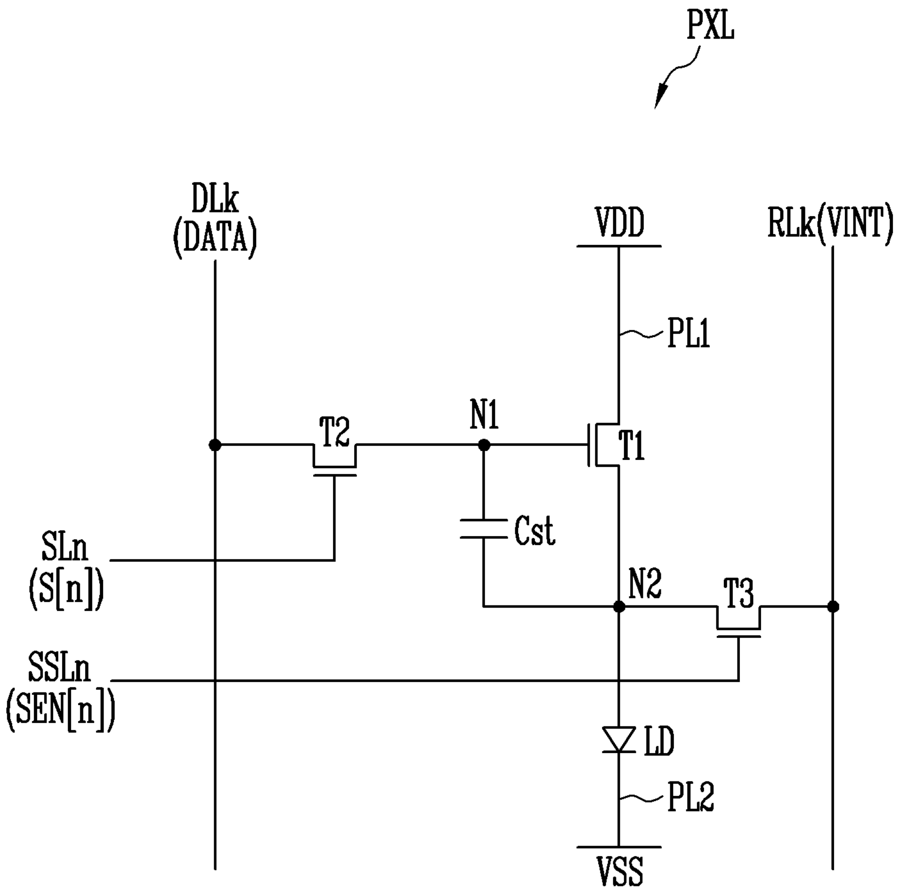
FIG. 2 is a schematic diagram of an equivalent circuit of a pixel included in the display device according to an embodiment.

FIG. 2 is a schematic diagram of an equivalent circuit of a pixel included in the display device according to an embodiment.

Referring to FIG. 2, a circuit diagram illustrating an example of a pixel included in the display device of FIG. 1 is shown. FIG. 2 shows a pixel PXL included in an n-th pixel row and a k-th pixel column as an example, where n and k may be positive integers.

Referring to FIG. 2, the pixel PXL may include a light emitting element LD, a first transistor T1 (or a driving transistor), a second transistor T2 (or a switching transistor), a third transistor T3 (or a sensing transistor), and a storage capacitor Cst.

The light emitting element LD may generate light having a luminance in response to the amount of current supplied from the first transistor T1. The light emitting element LD may include a first electrode and a second electrode. The first electrode may be connected to a second node N2, and the second electrode may be connected to a second power line PL2 to which the second driving voltage VSS is applied. In an embodiment, the first electrode may be an anode and the second electrode may be a cathode. According to an embodiment, the first electrode may be the cathode, and the second electrode may be the anode.

In an embodiment, the light emitting element LD may be an inorganic light emitting element formed of an inorganic material. In an embodiment, the light emitting element LD may be an organic light emitting element including an organic light emitting layer. The light emitting element LD may be a light emitting element composed of an inorganic material and an organic material in combination.

A first electrode of the first transistor T1 may be connected to a first power line PL1 to which the first driving voltage VDD is applied, and a second electrode of the first transistor T1 may be connected to the first electrode of the light emitting element LD (or the second node N2). A gate electrode of the first transistor T1 may be connected to a first node N1. In an embodiment, the first electrode may be a drain electrode, and the second electrode may be a source electrode.

The first transistor T1 may control the amount of current flowing through the light emitting element LD in response to a voltage of the first node N1. The first transistor T1 may be turned on in case that a voltage between the first node N1 and the second node N2 (for example, a gate-source voltage) is higher than a threshold voltage.

A first electrode of the second transistor T2 may be connected to a k-th data line DLk, and a second electrode of the second transistor T2 may be connected to the first node N1 (or the gate of the first transistor T1). A gate electrode of the second transistor T2 may be connected to an n-th scan line SLn. The second transistor T2 may be turned on in case that a scan signal S[n] (for example, a high level voltage) is supplied to the n-th scan line SLn to transfer a data voltage DATA supplied from the k-th data line DLk to the first node N1.

A first electrode of the third transistor T3 may be connected to a k-th sensing line RLk, and a second electrode may be connected to the second node N2 (or the second electrode of the first transistor T1). A gate electrode of the third transistor T3 may be connected to an n-th sensing control line SSLn. The third transistor T3 may be turned on in case that a sensing control signal SEN[n] (for example, a high level voltage) is supplied to the n-th sensing control line SSLn to electrically connect the k-th sensing line RLk and the second node N2. Accordingly, the initialization voltage VINT may be provided to the second node N2 for a time.

However, the disclosure is not limited thereto, and a sensing current (or sensing voltage) corresponding to a node voltage of the second node N2 may be transferred to the k-th sensing line RLk. The sensing current may be provided to the data driver 310 (see FIG. 1) through the k-th sensing line RLk. The sensing data corresponding to the sensing current may be the second sensing data.

The storage capacitor Cst may be connected between the first node N1 and the second node N2. The storage capacitor Cst may charge the data voltage DATA corresponding to the data signal supplied to the first node N1 during one frame. Accordingly, the storage capacitor Cst may store a voltage corresponding to a voltage difference between the first node N1 and the second node N2. Here, in case that the data voltage DATA is supplied, the initialization voltage VINT may be supplied to the second node N2, and accordingly, the storage capacitor Cst may store a voltage difference between the data voltage DATA and the initialization voltage VINT. Whether the first transistor T1 is turned on or turned off may be determined according to the voltage stored in the storage capacitor Cst.

A circuit structure of the pixel PXL is not limited by that which is illustrated in FIG. 2. For example, the light emitting element LD may be positioned or disposed between the first power line PL1 connected to the first driving voltage VDD and the first electrode of the first transistor T1.

Although the transistor is shown as an NMOS transistor in FIG. 2, the disclosure is not limited thereto. For example, at least one of the first to third transistors T1, T2, and T3 may be implemented as a PMOS transistor. Also, the first to third transistors T1, T2, and T3 shown in FIG. 2 may be thin film transistors including at least one of an oxide semiconductor, an amorphous silicon semiconductor, and a polycrystalline silicon semiconductor.

Hereinafter, a structure of the display device will be described with reference to FIG. 3.

Figure 3:
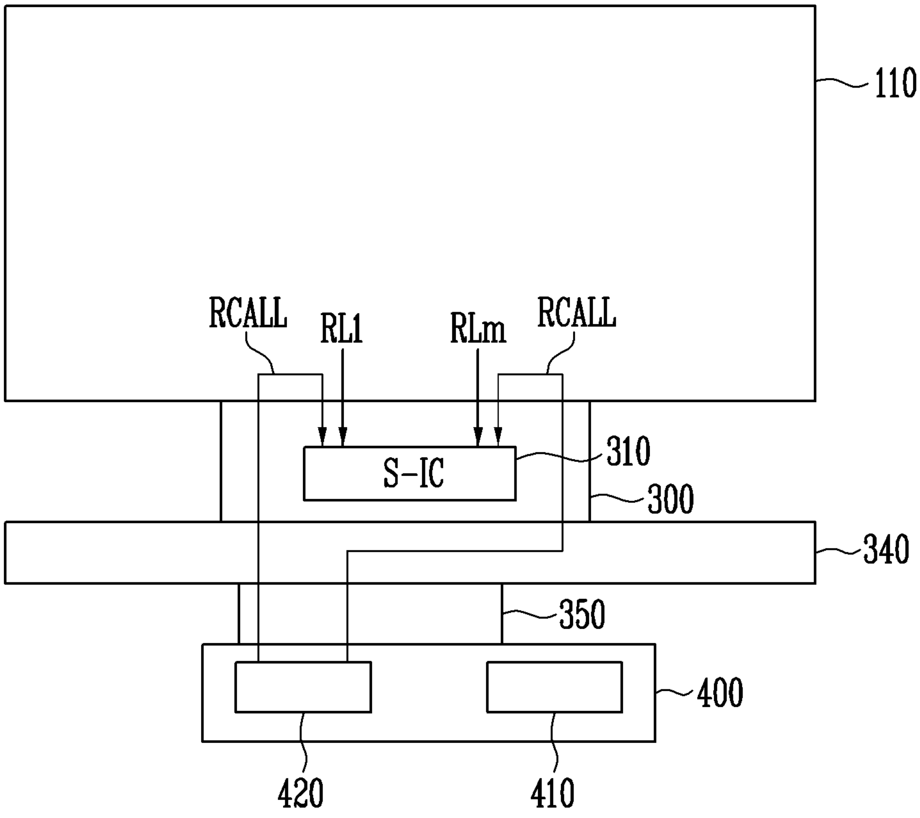
FIG. 3 is a schematic plan view schematically illustrating a partial configuration of the display device according to an embodiment.

FIG. 3 is a schematic plan view schematically illustrating a partial configuration of the display device according to an embodiment.

Referring to FIG. 3, in the display device according to an embodiment, the data driver 310 may be mounted on a circuit film 300. Here, the data driver 310 may be implemented as a data integrated circuit (S-IC).

The sensing lines RL1 to RLm may be connected to the data driver 310, and at least one reference voltage line RCALL may be connected to the data driver 310. The reference voltage Vrcal (see FIG. 4) for sensing a characteristic change that may occur due to heat generated by the data driver 310 in case that the display device is driven may be provided to the data driver 310 through the reference voltage line RCALL. Also, although not shown in FIG. 3, an initial channel voltage line CALL (see FIG. 4) providing the initial channel voltage Vcal (see FIG. 4) for sensing the initial deviation of the sensing channels may be connected to the data driver 310.

The at least one reference voltage line RCALL may be electrically connected to the power supply 420, and the initial channel voltage line CALL (see FIG. 4) may be electrically connected to the power supply 420.

The data driver 310 may be electrically connected to the display panel 110 and a printed circuit board 340 through the circuit film 300. The printed circuit board 340 may be implemented as a flexible printed circuit board (FPCB).

The timing controller 410 and the power supply 420 may be mounted on a control board 400. The printed circuit board 340 and the control board 400 may be connected to each other through a cable 350, so that signals can be transmitted between the timing controller 410, the power supply 420, and the data driver 310.

The cable 350 may electrically connect the control board 400 and at least one printed circuit board 340 through connectors (not shown). Here, the cable 350 may generally refer to a device having wires for electrically connecting the control board 400 and the printed circuit board 340. For example, the cable 350 may be implemented as a flexible circuit board.

Hereinafter, features of the data driver will be described, for example, with reference to FIGS. 4 to 8.

Figure 4:
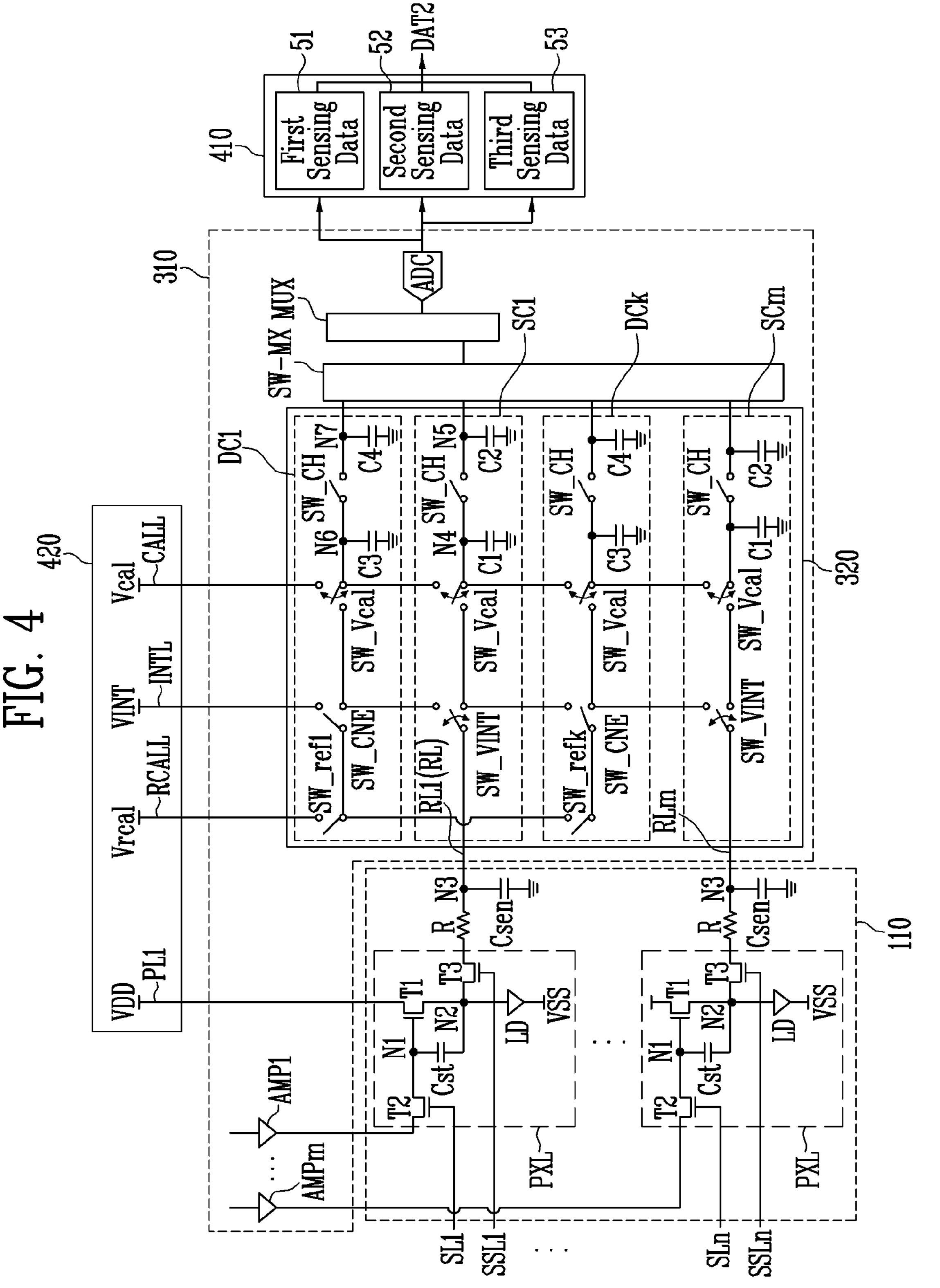
FIG. 4 is a circuit diagram illustrating an example of a data driver of the display device according to an embodiment.
Figure 5:
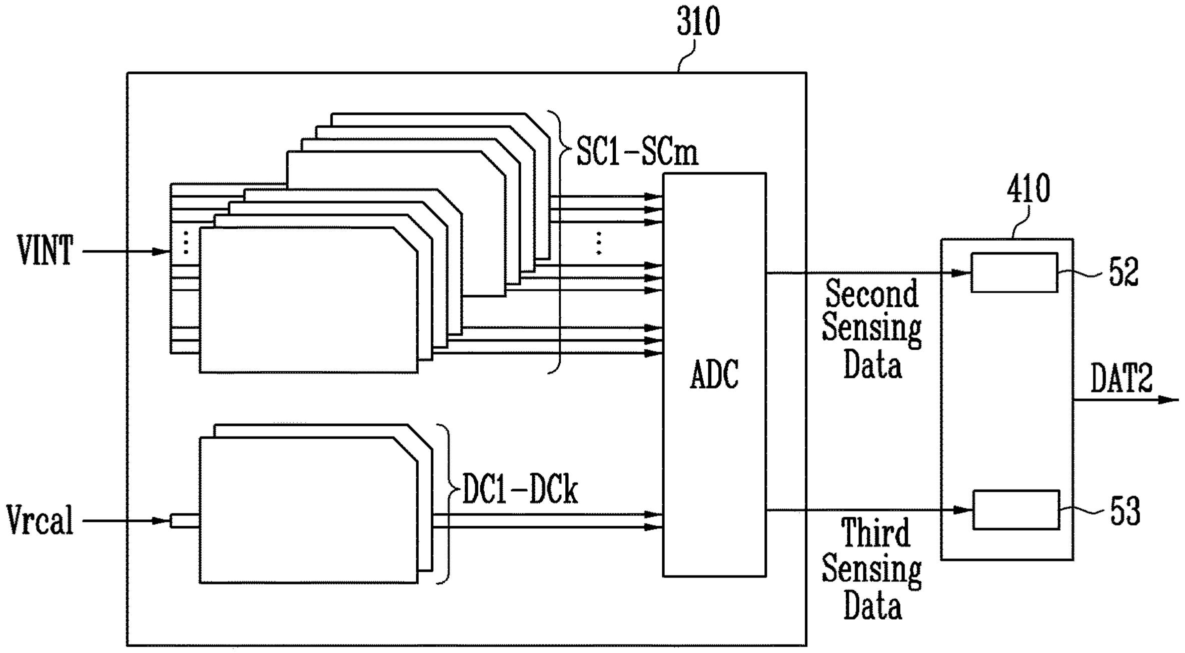
FIG. 5 is a schematic diagram for schematically explaining a sensing method of the data driver during a second sensing period in the display device according to an embodiment.
Figure 6:
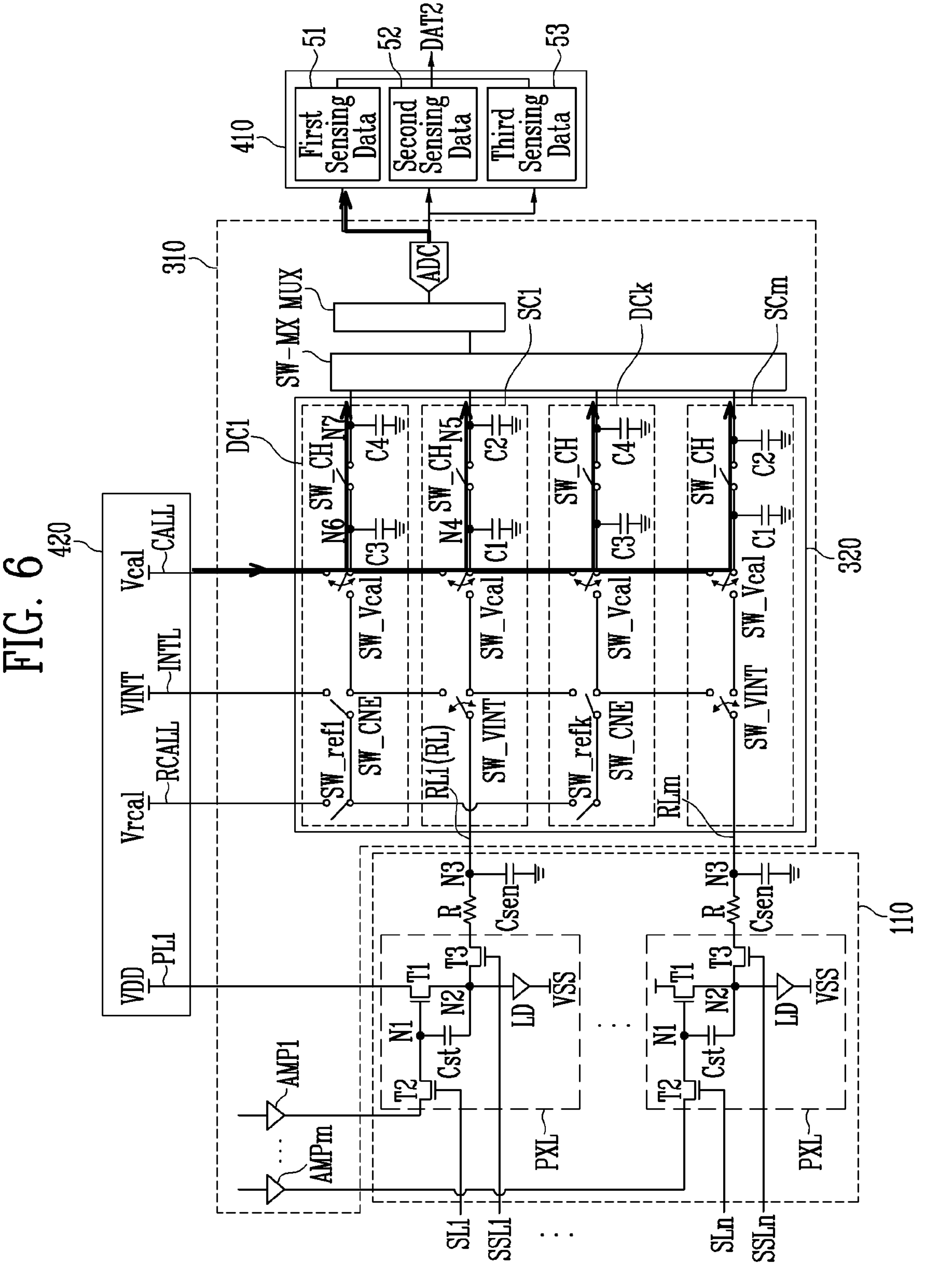
FIG. 6 is a circuit diagram for explaining a process in which first sensing data is generated in the circuit diagram shown in FIG. 4.
Figure 7:
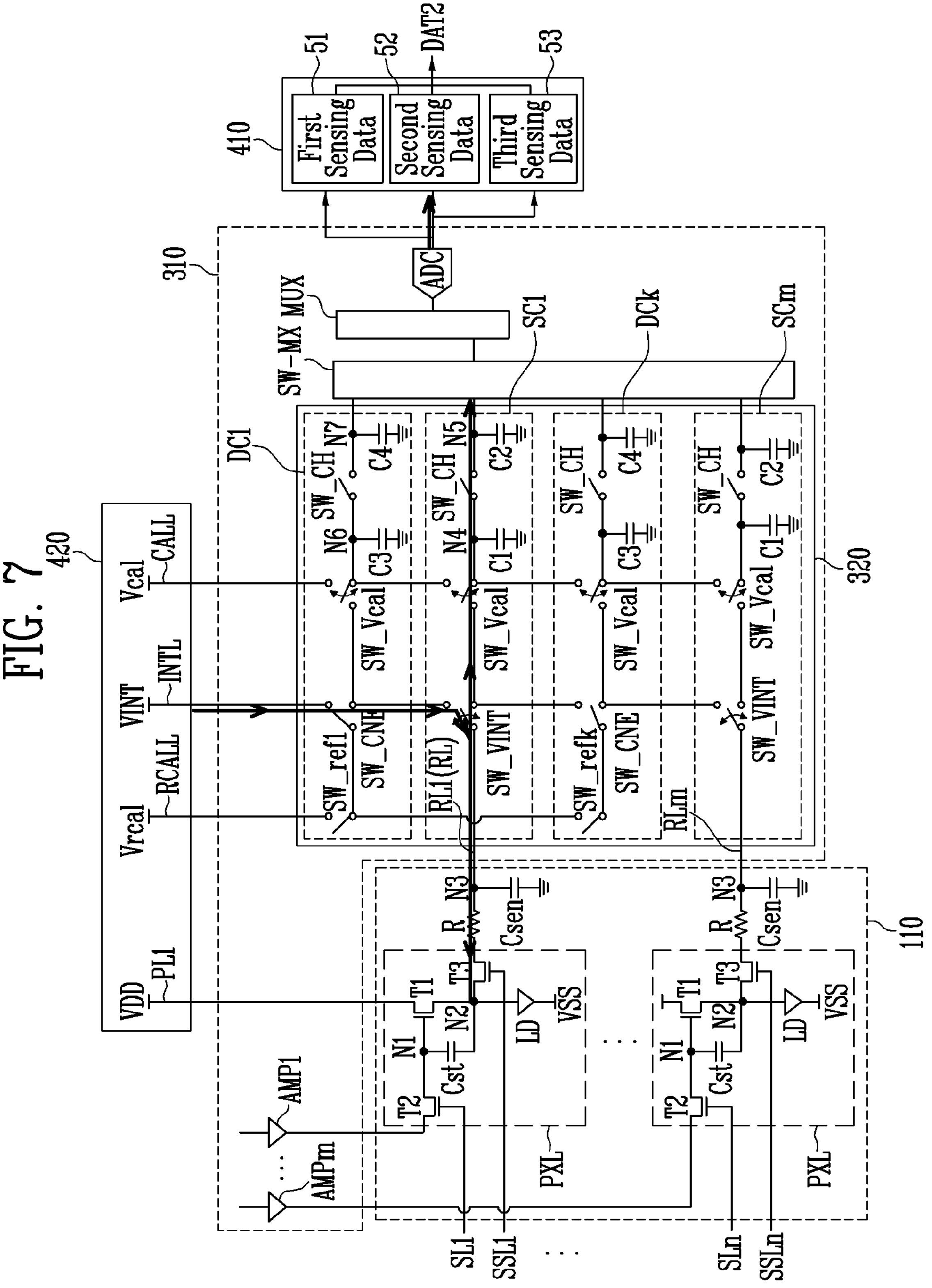
FIG. 7 is a circuit diagram for explaining a process in which second sensing data is generated in the circuit diagram shown in FIG. 4.
Figure 8:
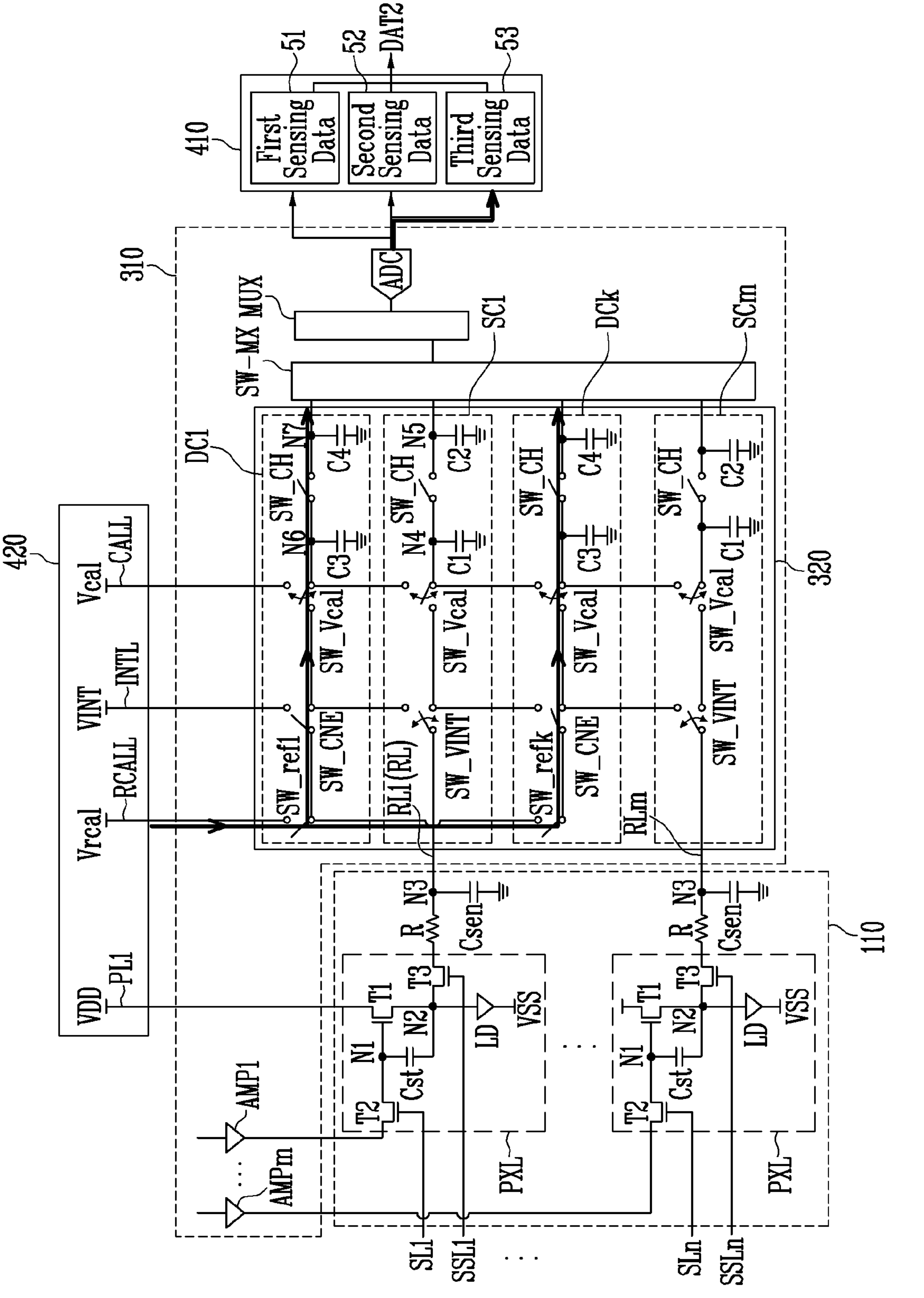
FIG. 8 is a circuit diagram for explaining a process in which third sensing data is generated in the circuit diagram shown in FIG. 4.

FIG. 4 is a circuit diagram illustrating an example of a data driver of the display device according to an embodiment. FIG. 5 is a schematic diagram for schematically explaining a sensing method of the data driver during a second sensing period in the display device according to an embodiment. FIG. 6 is a circuit diagram for explaining a process in which first sensing data is generated in the circuit diagram shown in FIG. 4. FIG. 7 is a circuit diagram for explaining a process in which second sensing data is generated in the circuit diagram shown in FIG. 4. FIG. 8 is a circuit diagram for explaining a process in which third sensing data is generated in the circuit diagram shown in FIG. 4. Hereinafter, reference is made to FIGS. 1 to 3 together.

Referring to FIG. 4, the display panel 110 may be electrically connected to the data driver 310 through the sensing lines RL1 to RLm. The display panel 110 may further include the pixels PXL, a resistor R, and a sensing capacitor Csen. Each pixel PXL may be electrically connected to the data driver 310 through the resistor R and the sensing capacitor Csen.

The sensing capacitor Csen may be connected between a third node N3 and a ground power source, and may store a voltage corresponding to the second node N2 in case that the third transistor T3 is turned on. Accordingly, in the second sensing period, the sensing capacitor Csen may provide a voltage corresponding to the second sensing data to the data driver 310.

The data driver 310 of the display device according to an embodiment may include source buffers AMP1 to AMPm, a sensing block 320, a switching matrix SW-MX, a multiplexer MUX, and an analog-to-digital converter ADC.

The source buffers AMP1 to AMPm may be electrically connected to the data lines DL1 to DLm (see FIG. 1) through pads (not shown), respectively. The pads and the data lines DL1 to DLm (see FIG. 1) may be included in the display panel 110 (see FIG. 1). For example, a first source buffer AMP1 may be electrically connected to a first data line DL1, and a m-th source buffer AMPm may be electrically connected to a m-th data line DLm.

The sensing block 320 may include sensing channels SC1 to SCm and at least one auxiliary sensing channel DC1 and DCk. Although FIG. 4 shows that the sensing block 320 may include only a first auxiliary sensing channel DC1 and a k-th auxiliary sensing channel DCk, but the disclosure is not limited thereto. According to an embodiment, the number of auxiliary sensing channels included in the sensing block 320 may be variously changed.

The sensing channels SC1 to SCm may be respectively connected to the sensing lines RL1 to RLm extending from the display panel 110 (or the pixel PXL). For example, the sensing channels connected to the sensing lines RL1 to RLm of the pixels PXL may include first to m-th sensing channels SC1 to SCm. An electrical connection state between the sensing channels SC1 to SCm and the sensing lines RL1 to RLm may vary depending on an operation of each initialization switch SW_VINT.

Also, each of the sensing channels SC1 to SCm may be connected to the initial channel voltage line CALL extended from the power supply 420. An electrical connection state between the sensing channels SC1 to SCm and the initial channel voltage line CALL may vary depending on an operation of each initial voltage switch SW_Vcal.

An electrical connection state between the sensing channels SC1 to SCm and the switching matrix SW-MX may vary depending on an operation of each channel switch SW_CH. In an embodiment, the channel switch SW_CH may continuously maintain a turned-on state in the first sensing period and the second sensing period.

Each of the sensing channels SC1 to SCm may include a first capacitor C1 and a second capacitor C2. The first capacitor C1 may be connected between a fourth node N4 and the ground power source. The second capacitor C2 may be connected between a fifth node N5 and the ground power source. In case that the channel switch SW_CH is turned on, the first capacitor C1 and the second capacitor C2 may be connected to each other in parallel to share a voltage stored in each capacitor.

Each of the auxiliary sensing channels DC1 and DCk may be connected to the reference voltage line RCALL extended from the power supply 420. An electrical connection state between the auxiliary sensing channels DC1 and DCk and the reference voltage line RCALL may vary depending on operation of each of reference switches SW_ref1 and SW_refk.

An electrical connection state between the auxiliary sensing channels DC1 and DCk and the switching matrix SW-MX may vary depending on an operation of each channel switch SW_CH.

Each of the auxiliary sensing channels DC1 and DCk may include a third capacitor C3 and a fourth capacitor C4. The third capacitor C3 may be connected between a sixth node N6 and the ground power source. The fourth capacitor C4 may be connected between a seventh node N7 and the ground power source. In case that the channel switch SW_CH is turned on, the third capacitor C3 and the fourth capacitor C4 may be connected to each other in parallel to share a voltage stored in each capacitor.

In an embodiment, one or more auxiliary sensing channels DC1 and DCk may be included in the sensing block 320. The auxiliary sensing channels DC1 and DCk may be positioned adjacent to at least one sensing channel among the first to m-th sensing channels SC1 to SCm. For example, the first auxiliary sensing channel DC1 may be positioned above the first sensing channel SC1, and the k-th auxiliary sensing channel DCk may be positioned above the m-th sensing channel SCm.

In an embodiment, while the display device is being driven, the auxiliary sensing channels DC1 and DCk may sense a characteristic change of the sensing block 320 at the same time in case that sensing characteristics of the pixel PXL. Therefore, a separate time for perform sensing may not be required.

Referring to FIG. 6, the sensing block 320 may generate the first sensing data corresponding to the initial channel voltage Vcal applied to each of the sensing channels SC1 to SCm and the auxiliary sensing channels DC1 and DCk through the initial channel voltage line CALL during the first sensing period.

The initial channel voltage Vcal may be a DC voltage having a magnitude. The initial channel voltage Vcal may be set according to characteristics of the display device.

The first sensing data may be data for identifying an initial channel deviation of the sensing channels SC1 to SCm in the display device. Accordingly, the sensing data of the first to m-th sensing channels SC1 to SCm among the first sensing data may be a reference for checking the channel deviation between the sensing channels SC1 to SCm.

The analog-to-digital converter ADC may convert voltages applied to the sensing channels SC1 to SCm and the auxiliary sensing channels DC1 and DCk into the first sensing data in digital format, and provide the first sensing data to the timing controller 410. The first sensing data may be stored in a first memory 51 of the timing controller 410.

During the first sensing period, the initial voltage switch SW_Vcal may be connected to the initial channel voltage line CALL and the channel switch SW_CH may be turned on, so that a voltage corresponding to the initial channel voltage Vcal provided through the initial channel voltage line CALL may be provided to the analog-to-digital converter ADC through the switching matrix SW-MX and the multiplexer MUX.

The first sensing data may include data corresponding to the initial channel voltage Vcal applied to the auxiliary sensing channels DC1 and DCk, and may include data corresponding to the initial channel voltage Vcal applied to the first to m-th sensing channels SC1 to SCm.

Referring to FIG. 7, the sensing block 320 may generate the second sensing data by sensing the characteristic information of the pixels PXL corresponding to the initialization voltage VINT applied through the initialization voltage line INTL during the second sensing period.

The analog-to-digital converter ADC may convert the voltage stored in the sensing capacitor Csen into the second sensing data in digital format and provide the second sensing data to the timing controller 410. The second sensing data may be stored in a second memory 52 of the timing controller 410.

During the second sensing period, in case that the initialization switch SW_VINT may be connected to the initialization voltage line INTL, the initialization voltage VINT provided through the initialization voltage line INTL may be provided to the second node N2 of the pixel PXL. Thereafter, in case that the initialization switch SW_VINT may be connected to the sensing lines RL1 to RLm, the initial voltage switch SW_Vcal may be connected to the sensing lines RL1 to RLm, and the channel switch SW_CH is turned on, the voltage stored in the sensing capacitor Csen may be provided to the analog-to-digital converter ADC through the switching matrix SW-MX and the multiplexer MUX.

Referring to FIG. 8, the sensing block 320 may generate the third sensing data corresponding to the reference voltage Vrcal applied to the auxiliary sensing channels DC1 and DCk through the reference voltage line RCALL during the second sensing period.

The reference voltage Vrcal may be the same as or different from the initial channel voltage Vcal. The reference voltage Vrcal may be set according to the characteristics of the display device.

Even if the reference voltage Vrcal is not provided separately from the power supply or power supply unit 420, the first driving voltage and a gamma voltage used in the data driver 310 may be used.

The third sensing data may be data for compensating for a characteristic change of the analog-to-digital converter ADC that may occur due to heat generated by the data driver 310 in case that the display device is driven.

The analog-to-digital converter ADC may convert voltages stored in the third capacitor C3 and the fourth capacitor C4 into the third sensing data in digital format, and provide the third sensing data to the timing controller 410. The third sensing data may be stored in a third memory 53 of the timing controller 410.

The timing controller 410 may reflect the characteristic change due to heat generated by the data driver 310 to the channel deviation of the auxiliary sensing channels DC1 and DCk and the first to m-th sensing channels SC1 to SCm by using the third sensing data.

By way of example, during the second sensing period, the third sensing data may be changed by heat generated by the data driver 310, and the timing controller 410 may calculate characteristic deviation information due to heat generated by the data driver 310 by comparing the first sensing data and the third sensing data. For example, the timing controller 410 may calculate the characteristic deviation information due to heat generated by the data driver 310 by comparing the first sensing data sensed in response to the initial channel voltage Vcal in the first auxiliary sensing channel DC1 and the third sensing data sensed in response to the reference voltage Vrcal.

Even in a sensing channel in which the auxiliary sensing channels DC1 and DCk are not located, the timing controller 410 may infer a deviation of the sensing channels in which the auxiliary sensing channels DC1 and DCk are not located by comparing the third sensing data and the first sensing data in which the auxiliary sensing channels DC1 and DCk are located based on the first sensing data stored in the first memory 51.

During the second sensing period, in case that the reference switches SW_ref1 and SW_refk are turned on, the connection switch SW_CNE is turned on, the initial voltage switch SW_Vcal is electrically connected to the reference voltage line RCALL, and the channel switch SW_CH is turned on, the voltage corresponding to the reference voltage Vrcal provided through the reference voltage line RCALL may be provided to the analog-to-digital converter ADC through the switching matrix SW-MX and the multiplexer MUX.

The timing controller 410 may generate the second image data DAT2 by changing the first image data DAT1 (see FIG. 1) based on the sensing data (for example, the first sensing data, the second sensing data, and the third sensing data) stored in the first, second, and third memories 51, 52, and 53. Accordingly, the data driver 310 may provide the compensated data signal (or data voltage) corresponding to the second image data DAT2 to the pixels PXL in the image display period.

The switching matrix SW-MX may be electrically connected to the sensing channels SC1 to SCm and at least one auxiliary sensing channel DC1 and DCk.

The switching matrix SW-MX may be connected between the sensing block 320 and the multiplexer MUX, may align the channel order of the sensing channels SC1 to SCm and at least one auxiliary sensing channel DC1 and DCk, and may provide the aligned information to the multiplexer MUX.

The multiplexer MUX may be electrically connected to the switching matrix SW-MX. The multiplexer MUX may be connected between the switching matrix SW-MX and the analog-to-digital converter ADC to selectively transmit outputs of the switching matrix SW-MX to the analog-to-digital converter ADC.

The analog-to-digital converter ADC may be electrically connected to the multiplexer MUX. The analog-to-digital converter ADC may convert the voltages applied to the sensing channels SC1 to SCm and the auxiliary sensing channels DC1 and DCk into the first sensing data, the second sensing data, and the third sensing data in digital format, and provide them to the timing controller 410.

In case that the display device is driven, a change in characteristics of the analog-to-digital converter ADC may occur due to heat generated according to the operation of the data driver 310. However, even if the change in characteristics of the analog-to-digital converter ADC occurs, the display device according to an embodiment may sense the change in characteristics of the analog-to-digital converter ADC by applying the reference voltage Vrcal to the sensing block 320 while sensing the characteristics of the pixel PXL. Therefore, the image data (or data voltage) can be compensated by reflecting the change in characteristic of the data driver 310.

The timing controller 410 may compensate the first image data DAT1 with the second image data DAT2 using the data to which the characteristic information of the pixels PXL is reflected by removing the initial deviation of the sensing channels SC1 to SCm from the second sensing data using the first sensing data and removing a characteristic deviation during the second sensing period using the third sensed data.

Accordingly, in an embodiment, since a deviation of the sensing block may be sensed together while sensing the characteristics of the pixel, the image data can be compensated by reflecting the change in characteristic of the data driver 310.

Referring to FIG. 5, the sensing channels included in the data driver 310 are shown as polygons that at least partially overlap.

Each of the sensing channels may apply the sensing current (or sensing voltage) corresponding to the applied voltage to the analog-to-digital converter ADC, and the analog-to-digital converter ADC may provide the sensing data to the timing controller 410 through digital conversion.

By way of example, in case that the initialization voltage VINT is applied, the sensing channels SC1 to SCm may sense the characteristic information of the pixels PXL (see FIGS. 2 and 4) corresponding to the initialization voltage VINT and supply the sensed characteristic information to the analog-to-digital converter ADC, and the analog-to-digital converter ADC may generate the second sensing data and provide the second sensing data to the second memory 52.

In case that the reference voltage Vrcal is applied, at least one auxiliary sensing channel DC1 to DCk may supply sensing information corresponding to the reference voltage Vrcal to the analog-to-digital converter ADC, and the analog-to-digital converter ADC may generate the third sensing data and provide the third sensing data to the third memory 53.

Accordingly, the timing controller 410 may remove the channel deviation generated during the second sensing period using the third sensing data, and may generate the second image data DAT2 by removing the initial deviation of the sensing channels from the second sensing data using the first sensing data described with reference to FIG. 4 together.

For example, in an embodiment, since the deviation of the sensing block may be sensed together by applying the reference voltage to the sensing block while sensing the characteristics of the pixel, the image data (or data voltage) can be compensated by reflecting the change in characteristic of the data driver.

According to the embodiments, since the deviation of the sensing block may be sensed together by applying the reference voltage to the sensing block while sensing the characteristics of the pixel, the image data (or data voltage) can be compensated by reflecting the change in characteristic of the data driver.

Effects of the disclosure are not limited to the above-described effects, and more various effects are included within the specification.

As described above, embodiments have been disclosed through the detailed description and the drawings. However, those skilled in the art or those of ordinary skill in the art will appreciate that various modifications and changes are possible without departing from the spirit and technical scope of the disclosure as set forth in the claims below.

Therefore, the disclosure is not limited to the detailed description described in the specification, but should also be determined by the appended claims.

What is claimed is:

1. A display device comprising:

pixels;

a sensing block generating first sensing data during a first sensing period, and generating second sensing data and third sensing data during a second sensing period, the sensing block including:

sensing channels; and at least one auxiliary sensing channel; and a timing controller compensating first image data with second image data based on the first sensing data, the second sensing data, and the third sensing data, wherein the sensing block generates the first sensing data corresponding to an initial channel voltage applied to each of the sensing channels and the at least one auxiliary sensing channel during the first sensing period, the sensing block generates the second sensing data by sensing characteristic information of the pixels corresponding to an initialization voltage applied to the pixels during the second sensing period, the sensing block generates the third sensing data corresponding to a reference voltage applied to the at least one auxiliary sensing channel during the second sensing period, and each of the sensing channels is electrically connected to an initial channel voltage line according to an operation of an initial channel voltage switch, and each of the sensing channels is electrically connected to a switching matrix according to an operation of a channel switch.

2. The display device of claim 1, wherein the timing controller compensates the first image data with the second image data by removing an initial deviation of the sensing channels from the second sensing data with the first sensing data and removing a deviation of the sensing block generated during the second sensing period with the third sensing data.

3. The display device of claim 1, wherein the first sensing period is a period for sensing characteristics of each of the sensing channels of the sensing block before driving the pixels, and the second sensing period is a period in which the initialization voltage is supplied to the pixels and the characteristic information of the pixels is sensed.

4. The display device of claim 3, further comprising:

a power supply generating and outputting the initial channel voltage, the initialization voltage, and the reference voltage, wherein the initial channel voltage is supplied to the sensing block through the initial channel voltage line electrically connected to the power supply, the initialization voltage is supplied to the sensing block through an initialization voltage line electrically connected to the power supply, and the reference voltage is supplied to the sensing block through a reference voltage line electrically connected to the power supply.

5. The display device of claim 4, further comprising:

the switching matrix electrically connected to the sensing block;

a multiplexer electrically connected to the switching matrix; and an analog-to-digital converter electrically connected to the multiplexer, wherein the analog-to-digital converter provides the first sensing data, the second sensing data, and the third sensing data to the timing controller.

6. The display device of claim 4, wherein the at least one auxiliary sensing channel is electrically connected to the reference voltage line according to an operation of a reference switch, and the at least one auxiliary sensing channel is electrically connected to the switching matrix according to an operation of the channel switch.

7. The display device of claim 1, wherein the at least one auxiliary sensing channel is adjacent to at least one channel among the sensing channels.

8. The display device of claim 1, wherein each of the pixels includes:

a light emitting element;

a first transistor electrically connected between a first electrode of the light emitting element and a power line and including a gate electrode electrically connected to a first node;

a second transistor electrically connected between a data line and the first node and including a gate electrode electrically connected to a scan line; and a third transistor electrically connected between a sensing line and a second node and including a gate electrode electrically connected to a sensing control line.

9. The display device of claim 8, wherein each of the sensing channels is electrically connected to the sensing line.

10. A display device comprising:

a display panel including pixels; and a data driver generating first sensing data by sensing characteristic information for each sensing channel during a first sensing period before the display panel is driven, and generating second sensing data by sensing characteristic information of the pixels during a second sensing period in which the display panel is driven, wherein the data driver generates third sensing data by sensing characteristic change information of the data driver during the second sensing period, each of the sensing channels is electrically connected to an initial channel voltage line according to an operation of an initial channel voltage switch, and each of the sensing channels is electrically connected to a switching matrix according to an operation of a channel switch.

11. The display device of claim 10, wherein the data driver includes:

a sensing block including the sensing channels and at least one auxiliary sensing channel;

the switching matrix electrically connected to the sensing block;

a multiplexer electrically connected to the switching matrix; and an analog-to-digital converter electrically connected to the multiplexer.

12. The display device of claim 11, further comprising:

a timing controller generating second image data by compensating for first image data based on the first sensing data, the second sensing data, and the third sensing data, and providing the second image data to the data driver.

13. The display device of claim 12, wherein the timing controller compensates the first image data with the second image data by removing an initial deviation of the sensing channels from the second sensing data with the first sensing data and removing a deviation of the sensing block generated during the second sensing period with the third sensing data.

14. The display device of claim 13, wherein the first sensing data corresponding to an initial channel voltage is generated by supplying the initial channel voltage to the sensing channels and the at least one auxiliary sensing channel during the first sensing period, the second sensing data corresponding to an initialization voltage is generated by supplying the initialization voltage to the sensing channels during the second sensing period, and the third sensing data corresponding to a reference voltage is generated by supplying the reference voltage to the at least one auxiliary sensing channel during the second sensing period.

15. The display device of claim 14, further comprising:

a power supply generating the initial channel voltage, the initialization voltage, and the reference voltage, outputting the initial channel voltage through the initial channel voltage line electrically connected to the data driver, outputting the initialization voltage through an initialization voltage line electrically connected to the data driver, and outputting the reference voltage through a reference voltage line electrically connected to the data driver.

16. The display device of claim 15, wherein the each of the sensing channels is electrically connected to the initial channel voltage line according to the operation of the initial channel voltage switch, and the each of the sensing channels is electrically connected to the switching matrix according to the operation of the channel switch.

17. The display device of claim 16, wherein the at least one auxiliary sensing channel is electrically connected to the reference voltage line according to an operation of a reference switch, and the at least one auxiliary sensing channel is electrically connected to the switching matrix according to an operation of the channel switch.

18. The display device of claim 11, wherein the at least one auxiliary sensing channel is adjacent to at least one channel among the sensing channels.

19. A display device comprising:

a display panel including pixels respectively electrically connected to sensing lines;

a data driver electrically connected to the sensing lines; and a power supply electrically connected to the data driver through an initial channel voltage line, an initialization voltage line, and at least one reference voltage line, wherein the power supply supplies a reference voltage for sensing characteristic information of the data driver through the at least one reference voltage line while the display panel is driven, and each of the sensing lines is electrically connected to the initial channel voltage line according to an operation of an initial channel voltage switch, and each of the sensing lines is electrically connected to a switching matrix according to an operation of a channel switch.

* * * * *